United States Patent [19]
Gordon

[11] Patent Number: 5,470,100
[45] Date of Patent: Nov. 28, 1995

[54] AIR BAG MODULE INFLATOR RETAINER

[75] Inventor: John E. Gordon, Brookville, Ohio

[73] Assignee: General Motors Corporation, Detroit, Mich.

[21] Appl. No.: 295,589

[22] Filed: Aug. 25, 1994

[51] Int. Cl.$^6$ ................................................. B60R 21/16
[52] U.S. Cl. ........................................ 280/728.2; 280/731
[58] Field of Search .............................. 280/728.2, 731, 280/741

[56] References Cited

U.S. PATENT DOCUMENTS

| | | | |
|---|---|---|---|
| 3,944,251 | 3/1976 | Lynch | 280/731 |
| 4,877,264 | 10/1989 | Cuevas | 280/731 |
| 4,988,119 | 1/1991 | Hartmeyer | 280/728.2 |
| 5,087,069 | 2/1992 | Corbett et al. | 280/731 |
| 5,131,677 | 7/1992 | Horiuchi et al. | 280/731 |
| 5,141,247 | 8/1992 | Barth | 280/728.2 |
| 5,195,774 | 3/1993 | Morita | 280/731 |
| 5,259,641 | 11/1993 | Schenk et al. | 280/731 |
| 5,366,239 | 11/1994 | Headley | 280/728.2 |
| 5,409,256 | 4/1995 | Gordon et al. | 280/728.2 |
| 5,421,607 | 6/1995 | Gordon | 280/728.2 |

Primary Examiner—Kenneth R. Rice
Attorney, Agent, or Firm—Howard N. Conkey

[57] ABSTRACT

An air bag module includes an inflator for discharging gas and a base plate including a plate opening. A plurality of stud members are mounted to the base plate and extend downwardly from the base plate. Each stud member includes a radial slot. The inflator includes an outwardly extending inflator flange which underlies and engages the base plate upon insertion of the inflator through the plate opening. The inflator flange is adapted for receiving the stud members therethrough such that the slots in the stud members open subjacent the inflator flange when the inflator flange engages the base plate. The air bag module includes an inflator retainer being a discontinuous resilient ring which is radially deformable for positioning the retainer in radial alignment with the slots. When the retainer is radially aligned with the slots, the retainer is releasable to snap-fittedly engage with each of the slots such that the retainer is captured and held in the slots. When the retainer is captured in the slots of the stud members, the inflator flange is trapped between the retainer and the base plate such that the inflator is anchored to the base plate and held in position relative to the base plate when discharging gas.

8 Claims, 4 Drawing Sheets

AIR BAG MODULE INFLATOR RETAINER

This invention relates to an air bag assembly in a vehicle, and more particularly to a mechanism for attaching an inflator to a base plate of an air bag module.

BACKGROUND OF THE INVENTION

It is well known in motor vehicles to provide an air bag module mounted to a vehicle steering wheel. A typical driver's side air bag module includes a generally circular inflator positioned partially within a bag opening of an air bag for discharging inflator gas into the air bag upon sensing certain predetermined vehicle conditions. Also in the air bag module, the inflator and air bag typically are housed within a housing and covered by a cover. Many air bag modules include a base plate having a central circular plate opening surrounded by a plurality of stud members which are used to mount o the fully-assembled air bag module to a hub portion of the steering wheel. It is desirable to have the air bag module assembled as a subassembly which can later be installed onto the hub portion of the steering wheel. This is typically accomplished by the air bag, inflator, housing and cover each being mounted to the base plate. It is also desirable for the inflator to be the final component which is added to the air bag module since it requires the most careful handling during the assembly process.

To accomplish facile assembly of the air bag module, the prior art has disclosed mechanisms permitting easy snap-fitted attachment of the air bag and cover to the base plate. The prior art has also disclosed mechanisms permitting easy snap-fitted attachment of the stud members of the base plate to the hub portion of the steering wheel.

However, attachment of the inflator to the base plate has typically been accomplished by using a multiplicity of fasteners, such as multiple rivets or bolts and nuts. This typical inflator attachment arrangement increases the number of components, manufacturing costs, and assembly time of the air bag module.

SUMMARY OF THE INVENTION

This invention provides an improved mechanism for attaching an inflator to a base plate of an air bag module which allows for facile attachment of the inflator to the base plate without the use of fasteners, reduces the number of components, manufacturing costs, and assembly time of the air bag module, allows easy access during assembly for the inflator to be the final component added to the air bag module, and may be utilized in existing air bag modules having a base plate including a plurality of stud members.

In accordance with the present invention, an air bag module includes an inflator for discharging gas and a base plate including a plate opening. A plurality of stud members are mounted to the base plate and extend downwardly from the base plate. Each stud member includes a radial slot. The inflator includes an outwardly extending inflator flange which underlies and engages the base plate upon insertion of the inflator through the plate opening. In addition, the inflator flange is adapted for receiving the stud members therethrough such that the slots in the stud members open subjacent the inflator flange when the inflator flange engages the base plate.

To anchor the inflator to the base plate, the air bag module of the present invention includes an inflator retainer being a discontinuous resilient ring which is radially deformable for positioning the retainer in radial alignment with the slots. When the retainer is radially aligned with the slots, the retainer is releasable to snap-fittedly engage with each of the slots such that the retainer is captured and held in the slots. When the retainer is captured in the slots of the stud members, the inflator flange is trapped between the retainer and the base plate such that the inflator is anchored to the base plate and held in position relative to the base plate when discharging gas.

In accordance with another aspect of this invention, each stud member includes an axial axis which is perpendicular to the base plate and each radial slot is tapered upwardly along the axial axis of the stud member. When the retainer is released, it slides upwardly along the slots until engagement with the inflator flange, thus trapping the inflator flange between the retainer and the base plate.

The present invention provides an improved mounting mechanism in an air bag module which permits simple attachment of an inflator to a base plate having a plate opening, without the use of fasteners. In addition, assembly time is reduced since the retainer may be quickly snapped into the place.

Since many existing air bag modules include a base plate having a plurality of stud members, this improved mounting mechanism advantageously permits utilization of the retainer in existing air bag modules simply by adding the radial slot to the existing stud members. Also advantageously, this invention replaces the multiplicity of fasteners normally required to attach the inflator to the base plate with a single snap-in retainer.

Furthermore, since the inflator and retainer are both installed from beneath the base plate, the invention is well-adapted for allowing the inflator and retainer to be the final component mounted to the base plate during assembly of the air bag module.

Thus, the present invention is characterized by providing simplicity, ease of assembly, and reduction of parts in attachment of an inflator to a base plate in an air bag module.

BRIEF DESCRIPTION OF THE DRAWINGS

These and other features, objects and advantages of the present invention will become apparent upon consideration of the following description of the preferred embodiment, appended claims, and accompanying drawings in which:

DESCRIPTION OF THE PREFERRED EMBODIMENT

Figure 1:
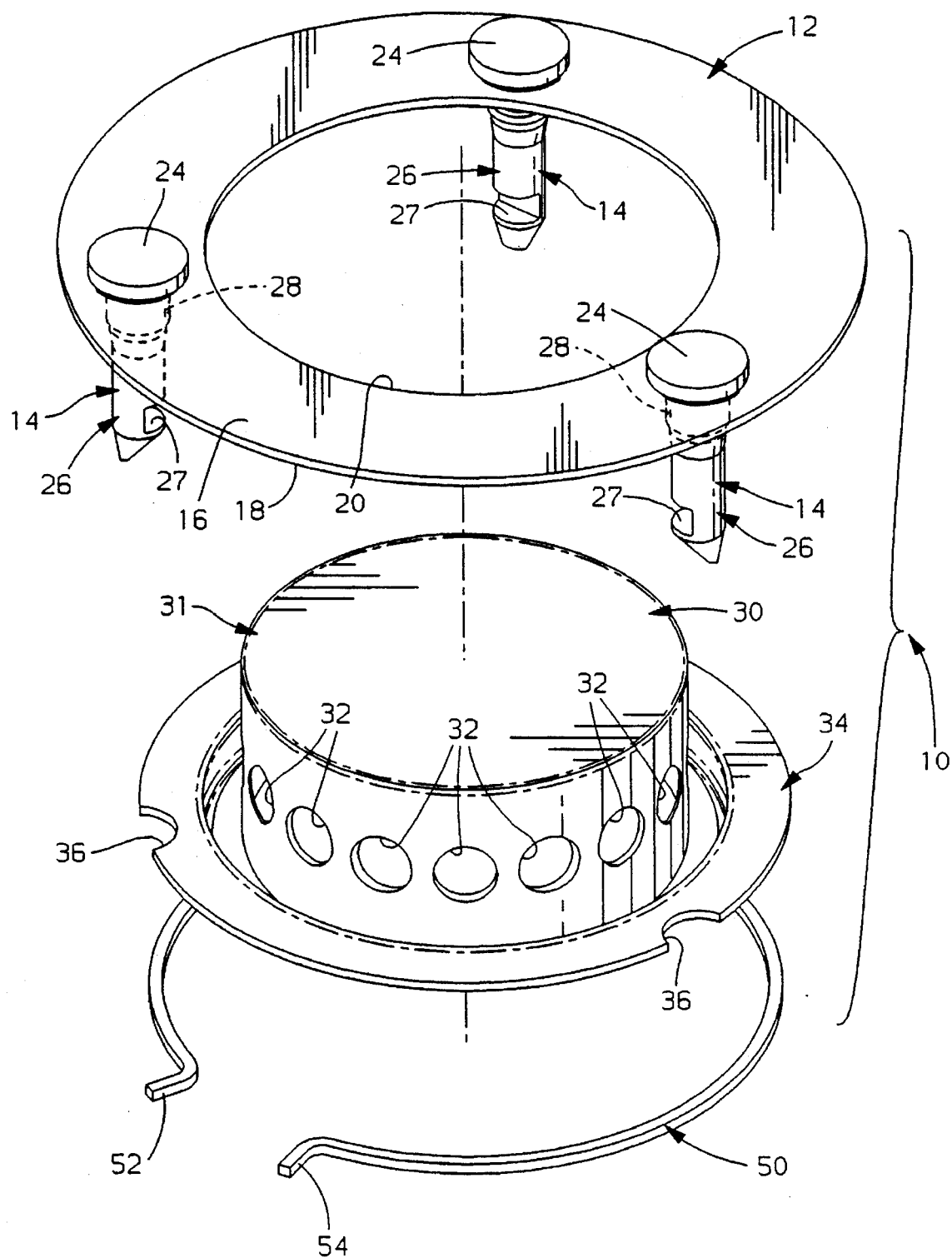
FIG. 1 is an exploded perspective view of an air bag module subassembly showing a base plate including a plurality of stud members, an inflator, and an inflator retainer.

As shown in FIGS. 1–4, a driver's side air bag module subassembly is generally designated as 10. The component parts of the module subassembly 10 include a base plate 12 including a plurality of stud members 14 mounted thereto, a generally circular inflator 30, and an inflator retainer 50. The module subassembly 10 is part of a complete air bag module which further includes an air bag (not shown) housed within a housing (not shown) and covered by a cover (not shown). The air bag, housing, and cover are mounted to the base plate 12 in a conventional manner. Thus, it will be appreciated that the inflator 30, air bag, cover, and housing are modularized with the base plate 12 to provide the air bag module.

Figure 3:
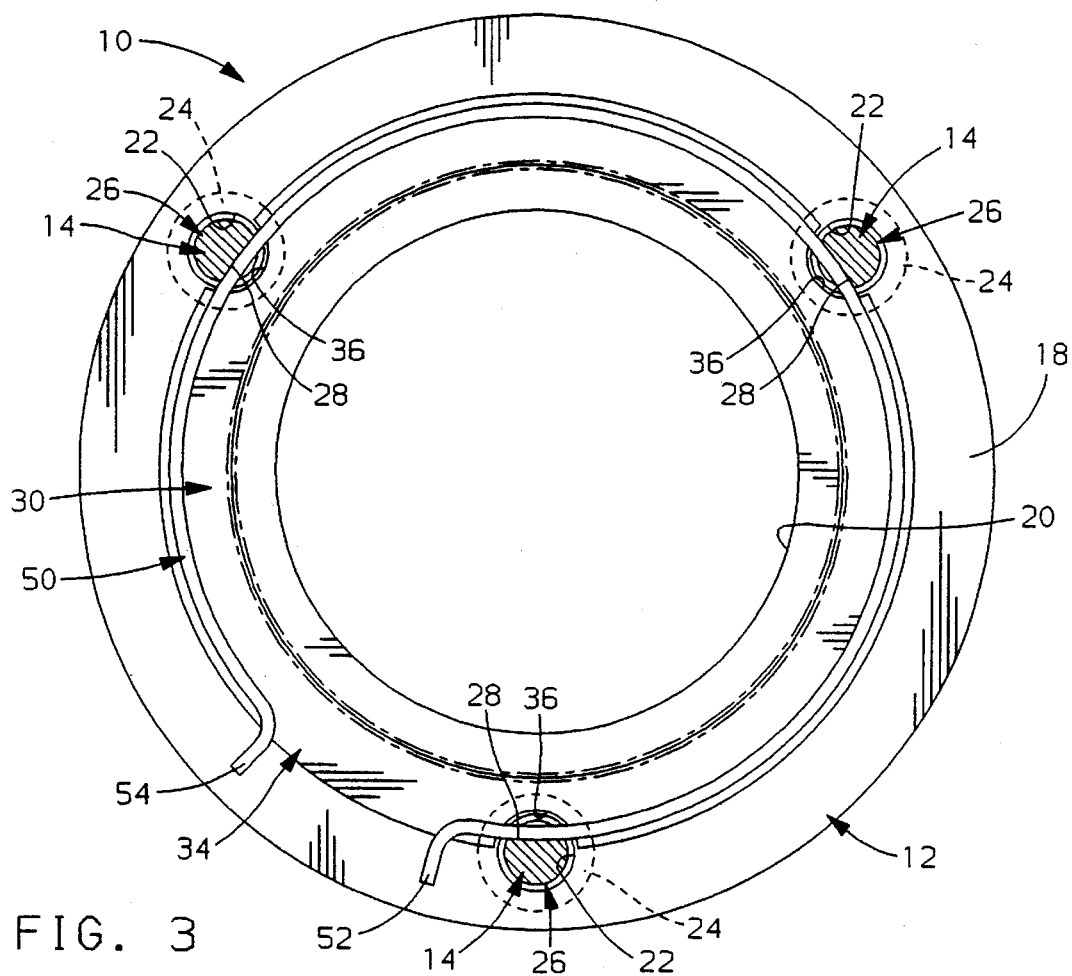
FIG. 3 is a bottom view of the air bag module subassembly in the assembled condition taken generally along line 3—3 of FIG. 4.

As best shown in FIG. 1, the base plate 12 is preferably circular and includes a top side 16, an opposite bottom side 18, and a centrally located circular plate opening 20 which has a diameter sized slightly larger than a main body 31 of the inflator 30. The base plate 12 includes a plurality of stud members 14 inserted through a plurality of respective mating apertures 22 via the top side 16 of the base plate 12. The stud members 14 are mounted to the base plate 12 in a predetermined pattern, preferably being spaced around the plate opening 20 in a circular pattern as best shown in FIG. 3. The stud members 14 each have a head portion 24 sized larger than the apertures 22 for engaging the top side 16 of the base plate 12. In addition, each stud member 14 has an elongated generally cylindrical body portion 26 extending downwardly from the base plate 12.

Figure 4:
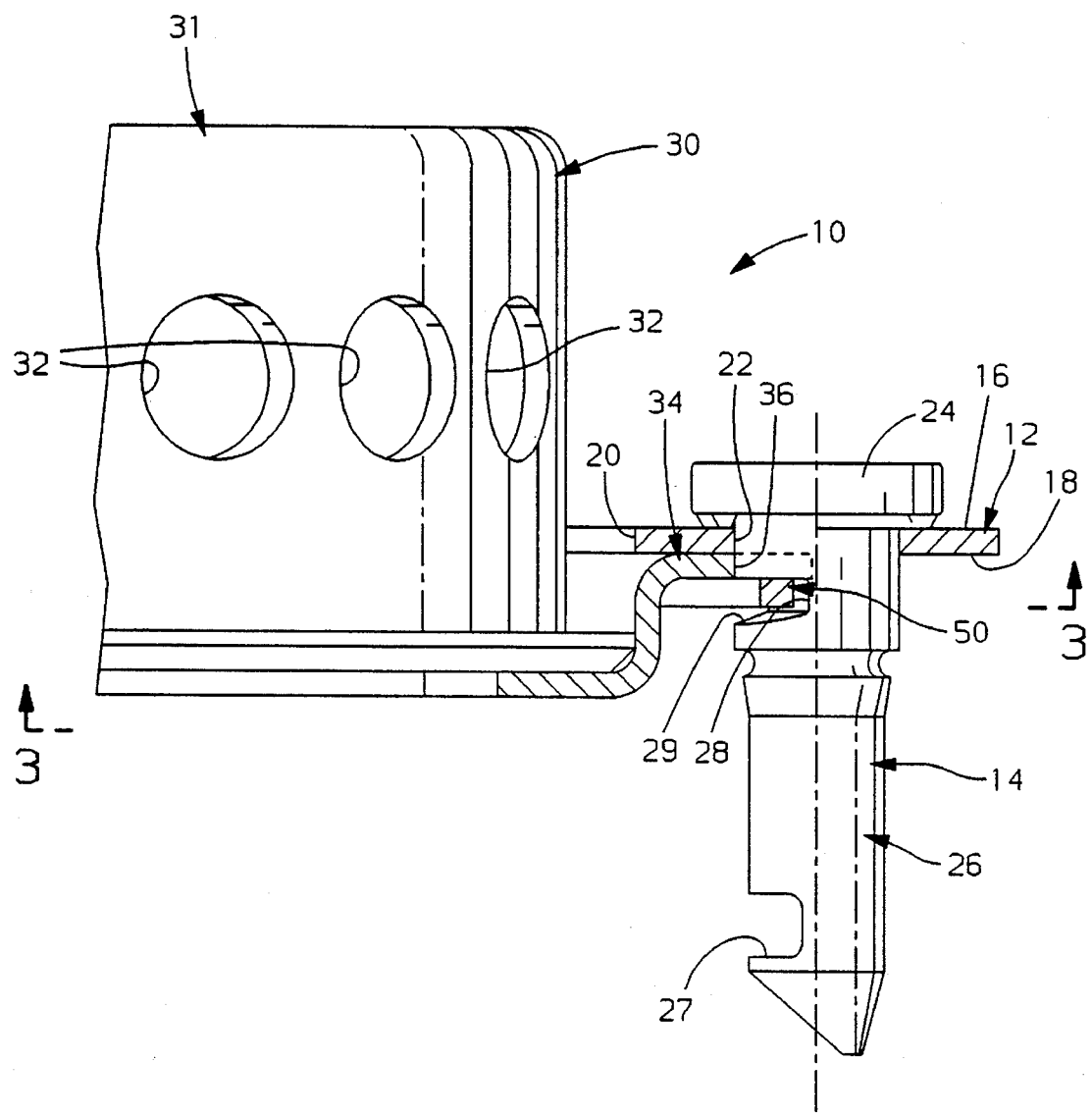
FIG. 4 is a sectional view taken along line 4—4 of FIG. 2 and showing the inflator partially broken away.

As best shown in FIG. 4, the body portion 26 of each of the stud members 14 includes a first radial slot 28 preferably facing the plate opening 20. An axial axis of each stud member 14 is perpendicular to the base plate 12. Each first radial slot 28 preferably has a lower cam surface 29 which tapers upwardly along the axial axis of the stud member 14. As best shown in FIG. 3, the first radial slots 28 of the stud members 14 cooperatively define a predetermined diameter which is greater than the diameter of the plate opening 20.

Referring to FIG. 4, each distal end of a stud member 14 includes a second radial slot 27 therein for engagement with a latch member (not shown) to secure the stud members 14, and thus the air bag module, to a vehicle steering wheel (not shown). For a detailed description of two examples of snap-in attachment of the stud members 14 to the vehicle steering wheel which may be utilized in conjunction with the present invention, refer to U.S. Pat. No. 5,087,069, entitled "Restraint Mounting System" issued Feb. 11, 1992 to Corbett et al. and U.S. patent application Ser. No. 08/140,821 entitled "Snap-In Inflatable Restraint Module Mounting Mechanism Including Latch Elements", filed Oct. 25, 1993 by Barry Christian Worrell et al., which are incorporated herein by reference.

Referring to FIG. 1, the module subassembly 10 includes an inflator 30 for generating gas to inflate the air bag when the inflator 30 receives a predetermined signal from a vehicle sensor, not shown. The inflator 30 has a generally circular shape and may be of a conventional construction for discharging gas such as through ports 32 in the main body 31 to inflate the air bag. The inflator 30 includes a peripheral outwardly extending inflator flange 34 which may be integral with the inflator 30 or attached thereto such as by welding or fastening. The inflator flange 34 includes a plurality of flange openings 36 axially aligned with respective stud members 14 for receiving the body portion 26 of the stud members 14 therethrough, as will be described further hereinafter. The term flange opening as defined for this invention includes grooves 36 as shown in FIG. 3 as well as closed holes 136 in the inflator flange 34 as shown in the alternate embodiment of FIG. 5.

Figure 2:
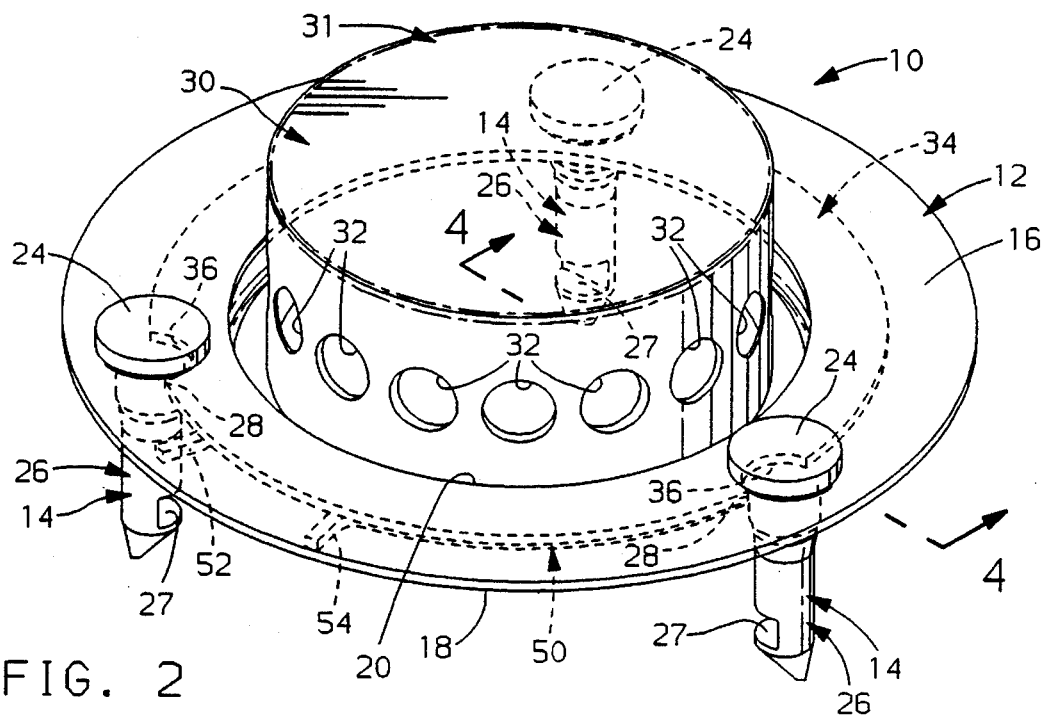
FIG. 2 is a view similar to FIG. 1 showing the air bag module subassembly in the assembled condition.

Referring to FIGS. 1–3, the inflator retainer 50 being a discontinuous, resilient, generally circular ring is preferably constructed of a relatively inexpensive wire material. As shown in FIG. 1, the retainer 50 has a normal or relaxed position in which a first bent end 52 and a second bent end 54 are circumferentially spaced apart such that the retainer 50 has a diameter greater than the diameter defined by the first radial slots 28 of the stud members 14. The retainer 50 is radially deformable, preferably being contractible by manual manipulation for insertion between the stud members 14, as will be further described hereinafter. The first and second bent ends 52, 54 may be gripped to assist with radial contraction of the retainer 50 during assembly.

Referring to FIGS. 1–3, the module subassembly 10 is assembled as follows. First, the stud members 14 are mounted to the base plate 12 such that the main body portion 26 of the stud members 14 extends downwardly from the bottom side 18 of the base plate 12. As best shown in FIG. 1, the stud members 14 are then axially aligned with the respective flange openings 36 on the inflator flange 34 such that the main body 31 of the inflator 30 can be inserted between the stud members 14 and through the plate opening 20 of the base plate 12. Upon complete insertion of the inflator 30 through the plate opening 20 as shown in FIGS. 2–4, the inflator flange 34 is parallel to the base plate 12 and underlies and engages the bottom side 18 of the base plate 12 such that the first radial slots 28 of the stud members 14 open subjacent the inflator flange 34.

To anchor the inflator 30 to the base plate 12 as shown in FIGS. 2–4, the retainer 50 is radially contracted and inserted between the stud members 14 and towards the bottom side 18 of the base plate 20 until the retainer 50 is parallel to the base plate 12 and inflator flange 34 and radially aligned with each of the first radial slots 28 of the stud members 14. The retainer 50 is then released and permitted to resiliently expand radially outward to snap-fittedly engage each of the first radial slots 28 of the stud members 14. Upon release, the retainer 50 expands radially outwardly and slides upwardly as aided by the cam surface 29 of the first radial slots 28 until the retainer 50 engages the inflator flange 34.

In the assembled condition shown in FIGS. 2–4, the retainer 50 is in a partially contracted position and engages each of the first radial slots 28 such that the retainer 50 applies an outward radial force on the first radial slots 28 and is captured and held therein. When the retainer 50 is captured in the first radial slots 28, the inflator flange 34 is trapped between the retainer 50 and the base plate 12 such that the inflator 30 is centrally mounted within the plate opening 20 of the base plate 12 and held in position relative to the base plate 12 when discharging gas.

Upon actuation, the inflator 30 discharges inflator gas. The ports 32 of the inflator 30 direct the discharging inflator gas upwardly to inflate the air bag which will deploy out through the housing and cover in a well-known manner. During the application of the forces associated with the discharge of inflator gas, the retainer 50 captured in the first radial slots 28 and underlying and engaging the inflator flange 34 traps the inflator flange 34 between the retainer 50 and the base plate 12 to hold the inflator 30 in position relative to the base plate 12.

Figure 5:
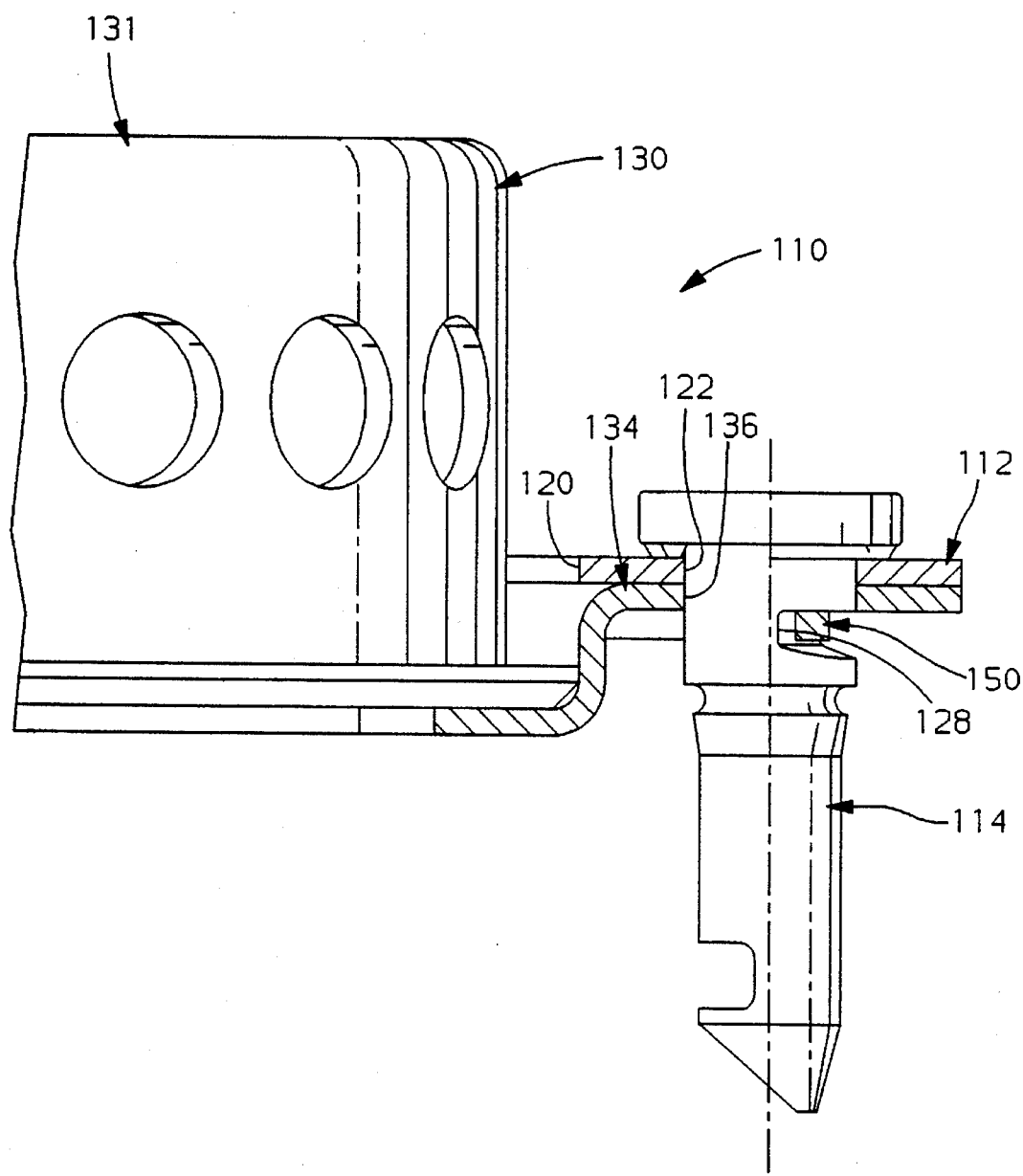
FIG. 5 is a view similar to FIG. 4, but showing an alternate embodiment of the invention.

Although the present invention has been described in considerable detail with reference to the preferred embodiment of FIGS. 1 through 4, other versions are possible. For example, FIG. 5 shows an alternate embodiment of this invention in which the base plate 112 including a circular plate opening 120 has a plurality of stud members 114 mounted thereto, each stud member 114 including a radial slot 128 facing away from the plate opening 120.

An inflator 130 has a main body portion 131 and an outwardly extending peripheral inflator flange 134 which includes a plurality of flange openings 136 being axially aligned for receiving the stud members 114 therethrough. Upon complete insertion of the inflator 130 through the plate opening 120, the inflator flange 134 is parallel to the base plate 112 and underlies and engages the base plate 112 such that the radial slots 128 of the stud members 114 open subjacent the inflator flange 134.

An inflator retainer 150 being a discontinuous, resilient, generally circular ring is radially expandable for surrounding the stud members 114 to allow positioning of the retainer 150 in radial alignment with the slots 128 on the stud members 114. Upon radial alignment with the slots 128, the retainer 150 is releasable for snap-fitted engagement within each of the slots 128 such that the retainer 150 is captured and held in the slots 128. When the retainer 150 is captured in the slots 128, the inflator flange 134 is trapped between the retainer 150 and the base plate 112 such that the inflator 130 is centrally mounted within the plate opening 120 of the base plate 112 and held in position relative to the base plate 112 when discharging gas.

It will be appreciated that the retainer 50, 150 being a radially deformable, discontinuous, resilient ring provides an improved mounting mechanism permitting simple snap-in attachment of the inflator 30, 130 to the base plate 12, 112 without the use of fasteners, thus reducing assembly time. Since many existing air bag modules include a base plate 12, 112 having a plate opening 20, 120 and a plurality of stud members 14, 114 this improved mounting mechanism is advantageous since it may be utilized in many existing air bag modules simply by adding the first radial slot 28, 128 to each of the stud members 14, 114. Also advantageously, the multiplicity of fasteners and fastening apertures normally required for attaching the inflator 30, 130 to the base plate 12, 112 are eliminated. As a further advantage, the inflator 30, 130 and retainer 50, 150 may easily be the final components added to the air bag module during the assembly process since complete installation of the inflator 30, 130 and retainer 50, 150 only requires access from the bottom side 18 of the base plate 12, 112 which is normally accessible even after typical attachments of the air bag, cover, and housing to the base plate 12, 112.

While the present invention has been described as carried out in a specific embodiments thereof, it is not intended to be limited thereby but is intended to cover the invention broadly within the scope and spirit of the appended claims.

The embodiments of the invention in which an exclusive property or privilege is claimed are defined as follows:

1. In an air bag module including an inflator for discharging gas and a base plate including a plate opening, a mechanism for attaching the inflator to the base plate comprising:

a plurality of stud members mounted to the base plate and extending downwardly therefrom;

the inflator including an outwardly extending inflator flange underlying and engaging the base plate upon insertion of the inflator through the plate opening, the inflator flange adapted for receiving the stud members therethrough, each stud member including a radial slot opening subjacent the inflator flange when the inflator flange engages the base plate; and an inflator retainer being a discontinuous resilient ring which is radially deformable for positioning the retainer in radial alignment with the slots and being releasable to snap-fittedly engage with each of the slots such that the retainer is captured and held therein whereby the inflator flange is trapped between the retainer and the base plate such that the inflator is anchored to the base plate and held in position relative to the base plate when discharging gas.

2. The mechanism of claim 1 wherein each slot faces the plate opening and the retainer is radially contractible for insertion between the stud members and upon radial alignment with the slots the retainer being releasable for radial expansion to snap-fittedly engage with each of the slots such that the retainer applies an outward radial force on the slots and is captured and held therein.

3. The mechanism of claim 2 wherein the retainer has first and second laterally bent ends to assist with radial contraction of the retainer.

4. The mechanism of claim 1 wherein each stud member includes an axial axis perpendicular to the base plate and each slot is tapered upwardly along the axial axis of the stud member such that upon release the retainer slides upwardly along the slots until engagement with the inflator flange.

5. In an air bag module including a generally circular inflator and a base plate having a circular plate opening, a mechanism for attaching the inflator to the base plate comprising:

a plurality of stud members mounted to the base plate in a predetermined circular pattern about the plate opening and extending downwardly from the base plate, each of the stud members including a radial slot facing the plate opening, the slots cooperatively defining a predetermined circular diameter;

the inflator including a peripheral outwardly extending inflator flange underlying and engaging the base plate upon insertion of the inflator through the plate opening, the inflator flange including a plurality of flange openings aligned for receiving the stud members therethrough such that the slots in the stud members open subjacent the inflator flange when the inflator flange engages the base plate; and an inflator retainer being a discontinuous resilient ring having a relaxed position in which the retainer has a diameter greater than the diameter defined by the slots, the retainer having a partially contracted position in which the retainer has a diameter less than the diameter defined by the slots, the retainer being radially contractible for insertion between the stud members and, upon radial alignment with the slots, the retainer being releasable to the partially contracted position for snap-fitted engagement within each of the slots such that the retainer is captured and held therein whereby the inflator flange is trapped between the retainer and the base plate such that the inflator is anchored to the base plate and held in position relative to the base plate when discharging gas.

6. The mechanism of claim 5 wherein each stud member includes an axial axis perpendicular to the base plate and each slot is tapered upwardly along the axial axis of the stud member such that upon release the retainer radially expands and slides upwardly along the slots until engagement with the inflator flange.

7. The mechanism of claim 5 wherein the retainer has first and second laterally bent ends to assist with radial contraction of the retainer.

8. A method of assembling an inflator to a base plate which includes the base plate having a circular opening, a plurality of stud members mounted to the base plate in a predetermined circular pattern, each of the stud members including a radial slot facing the plate opening and cooperatively defining a predetermined diameter, a generally cylindrical inflator including an outwardly extending inflator flange having a plurality of flange openings for receiving the stud members therethrough, and an inflator retainer being a discontinuous, resilient, circular ring which is radially contractible, the retainer having a relaxed position in which the retainer has a diameter greater than the diameter defined by the slots, the retainer having a partially contracted position in which the retainer has a diameter less than the diameter defined by the slots, comprising the steps of:

a. aligning the stud members with the inflator flange openings and inserting the inflator through the plate opening such that the inflator flange engages the base plate and the slots in the stud members open subjacent the inflator flange;

b. radially contracting the retainer for insertion between the stud members and radially aligning the retainer with the slots; and c. releasing the retainer for outward radial expansion to the partially contracted position such that the retainer snap-fittedly engages each of the slots and is captured and held in the slots such that the inflator flange is trapped between the retainer and the base plate whereby the inflator is anchored to the base plate.

* * * * *